United States Patent
Xu et al.

(10) Patent No.: US 7,619,128 B2
(45) Date of Patent: Nov. 17, 2009

(54) STABILIZING CATALYST ACTIVITY DURING CATALYST REGENERATION

(75) Inventors: Teng Xu, Houston, TX (US); Stephen Neil Vaughn, Kingwood, TX (US); Kenneth R. Clem, Humble, TX (US); James H. Beech, Jr., Kingwood, TX (US); Pete N. Loezos, Houston, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 922 days.

(21) Appl. No.: 11/089,965

(22) Filed: Mar. 25, 2005

(65) Prior Publication Data

US 2006/0217581 A1 Sep. 28, 2006

(51) Int. Cl.
  *C07C 1/00* (2006.01)
  *B01J 38/12* (2006.01)
(52) U.S. Cl. .......................... 585/640; 502/38; 502/44; 502/52; 502/56; 502/208; 502/214; 502/514
(58) Field of Classification Search ......... 585/639–640; 502/44, 52, 38, 56, 208, 214, 514
  See application file for complete search history.

(56) References Cited

U.S. PATENT DOCUMENTS 3,926,842 A * 12/1975 Suggitt et al. ................. 502/53

| 4,764,269 A | 8/1988 | Edwards et al. ............. 208/120 |
| 5,059,738 A | 10/1991 | Beech, Jr. et al. |
| 5,151,393 A | 9/1992 | Harandi et al. |
| 5,771,174 A | 6/1998 | Spinner et al. |
| 6,245,703 B1 * | 6/2001 | Kuechler et al. ............. 502/22 |
| 6,290,916 B1 | 9/2001 | Sechrist et al. ............. 422/145 |
| 6,316,683 B1 | 11/2001 | Janssen et al. ............. 585/640 |
| 6,633,802 B2 | 10/2003 | Sodoski et al. |
| 2003/0163010 A1 | 8/2003 | Xu et al. |

FOREIGN PATENT DOCUMENTS

| EP | 0 359 841 | 3/1990 |
| EP | 0 620 631 | 10/1994 |
| WO | WO 99/55799 | 4/1999 |
| WO | WO2005/023425 | 3/2005 |
| WO | WO2005/078064 | 8/2005 |

OTHER PUBLICATIONS

Mees et al, "Improvement of the Hydrothermal Stability of SAPO-34," Chem. Commun., 2003, (1), pp. 44-45.

* cited by examiner

*Primary Examiner*—In Suk Bullock
(74) *Attorney, Agent, or Firm*—Kevin M. Faulkner; Frank E. Reid

(57) ABSTRACT

This invention is directed to methods of converting oxygenates to olefin products. The methods provided include steps for protecting against deactivation of active molecular sieve catalysts during the conversion process. In particular, the invention provides for methods of regenerating coked catalyst to minimize catalyst deactivation due to contact with moisture.

49 Claims, 6 Drawing Sheets

STABILIZING CATALYST ACTIVITY DURING CATALYST REGENERATION

FIELD OF THE INVENTION

This invention relates to the catalytic conversion of oxygenate to olefin product using catalyst that contains one or more types of crystalline molecular sieve compositions. In particular, this invention relates to operating the regeneration section of such conversion systems to minimize the deactivation of the catalyst due to the effects of moisture.

BACKGROUND OF THE INVENTION

Oxygenates can be catalytically converted to olefin product using a molecular sieve catalyst. The oxygenates are converted by contacting catalytic sites that are located within porous regions of the catalyst. As the oxygenate is converted to product inside these porous regions, the product tends to leave the pores. However, over reaction also occurs, which leads to a hydrocarbon layer, typically referred to as a coke layer, being formed on the surface and in the pores of the catalyst. Once the pores of the catalyst are filled or covered by this coke layer, no oxygenate can enter the pores and contact the active catalyst site for additional conversion, so the catalyst becomes deactivated. The catalyst can be re-activated under these circumstances by removing the coke layer. Conventionally, this re-activation is done by burning off the coke layer under relatively high combustion conditions, referred to as regeneration. The result is that the once coked catalyst has been made active, or activated, for re-use.

Catalysts containing silicoaluminophosphate molecular sieves are typically used to convert the oxygenates to olefin product, because the product typically contains a high amount of prime olefins, which are typically considered the low carbon number olefins such as ethylene and propylene. Some of these catalysts in their activated form have been found to be particularly sensitive to moisture effects, as prolonged exposure of the active catalysts to moisture can also deactivate the catalyst.

U.S. Pat. No. 6,316,683 B1 (Janssen et al.) discloses a method of protecting catalytic activity of a silicoaluminophosphate (SAPO) molecular sieve by shielding the internal active sites of the molecular sieve from contact with moisture. The template itself can serve as the shield, or an anhydrous blanket can serve as a shield for an activated sieve that does not include template. It is desirable to shield the active sites, because activated SAPO molecular sieves will exhibit a loss of catalytic activity when exposed to moisture.

U.S. Pat. No. 4,764,269 (Edwards et al.) discloses a method of protecting SAPO-37 catalyst from deactivating as a result of contact with moisture. The catalyst is maintained under storage conditions such that the organic template component of the molecular sieve is retained in the SAPO-37 molecular sieve, until such time as the catalyst is placed into a catalytic cracking unit. When the catalyst is exposed to the FCC reaction conditions, wherein the reactor is operated at 400° to 600° C. and the regenerator operated at about 600° to 850° C., the organic template is removed from the molecular sieve pore structure, and the catalyst becomes activated for the cracking of hydrocarbons. According to this procedure, there is little if any contact with moisture.

Mees et al., "Improvement of the Hydrothermal Stability of SAPO-34," Chem. Commun., 2003, (1), 44-45, first published as an advance article on the web Nov. 22, 2002, discloses a method of protecting SAPO-34 molecular sieve, based on a reversible reaction of $NH_3$ with acid sites of the sieve. The method transforms a $H^+$-SAPO-34 into an $NH_4^+$-SAPO-34 in reversible way. The $NH_4^+$-SAPO-34 is said to be able to withstand severe steaming for an extended period of time without loss of structural integrity and acidity.

Oxygenate conversion reaction systems often incorporate the use of a fluidized bed reactor and regenerator, and operation of such systems is largely not practical without the use of steam injection. Typically the steam is used as motive and cooling source for the catalyst used, and some fluidized bed systems provide for removal of accumulated water. For example, U.S. Pat. No. 6,290,916 B1 (Sechrist et al.) discloses a method for removing water from a regenerator using circulating catalyst as an adsorbent.

Since various molecular sieves are susceptible to damage due to contact with water, and such systems are often used in conjunction with fluidized bed reaction systems, it would be beneficial to operate such systems at low moisture levels. Alternatively, it would be beneficial to operate such systems in such a way that the presence of water would have low or no impact on catalyst activity. Thus, additional methods of operating oxygenate conversion systems to minimize catalyst deactivation due to moisture effects are desired.

SUMMARY OF THE INVENTION

This invention provides methods of converting oxygenates to olefin products. The methods provide steps for protecting against deactivation of active molecular sieve catalysts during the conversion process.

According to one embodiment of the invention, there is provided a process for reducing deactivation of catalyst used in converting oxygenate to an olefin composition. The process includes providing a catalyst that comprises molecular sieve crystals having a molecular framework that includes $[AlO_4]$ and $[SiO_4]$ tetrahedral units. The oxygenate is contacted with the catalyst in a reactor to form the olefin composition and a coked catalyst.

In one aspect of the above embodiment, at least a portion of the coked catalyst in the reactor is sent to a regenerator and contacted with regeneration gas in the regenerator so as to remove at least a portion of the coke composition on the coked catalyst at an average regenerator temperature of not greater than 690° C. In another embodiment, at least a portion of the coked catalyst is heated in an environment that has not greater than 1.0 mole percent oxygen, and the heated catalyst is then contacted with regeneration gas in a regenerator so as to remove at least a portion of the coke composition on the catalyst. In another embodiment, at least a portion of the coked catalyst is contacted with regeneration gas in the regenerator so as to remove at least a portion of the coke composition on the coked catalyst, with the regenerator having a water partial pressure of not greater than 4.16 psia (28.7 kPa).

In another aspect of any of the above embodiments, the coke composition is removed at an average regenerator temperature of not greater than 660° C. Preferably, the coke composition is removed at an average regenerator temperature of not greater than 630° C., more preferably not greater than 600° C.

In another aspect of any of the above embodiments, the coke composition is removed in the regenerator at a hydrothermal stability index of greater than 1. Preferably, the coke composition is removed in the regenerator at a hydrothermal stability index of at least 1.1, more preferably at least 1.2, and most preferably at least 1.3.

In yet another aspect of any of the above embodiments, the regenerator has a water partial pressure of not greater than 4.16 psia (28.7 kPa). Alternately, the regeneration gas is added to the regenerator at a water partial pressure of not greater than 4 psia (27 kPa).

In another aspect of any of the above embodiments, the regeneration gas is compressed to condense at least a portion of water contained in the gas prior to contacting the coked catalyst. Alternatively, the regeneration gas is compressed, and the compressed regeneration gas is contacted with a water adsorbent, prior to contacting with the coked catalyst.

In another aspect of any of the above embodiments, the regeneration gas comprises oxygen. In another, the coked catalyst is heated prior to contacting with regeneration gas.

In another aspect of any of the above embodiments, the coked catalyst is heated in an environment that has not greater than 1.0 mole percent oxygen. Alternatively, the coked catalyst is heated to a temperature that is higher than the average reactor temperature. Preferably, the coked catalyst is heated to a temperature that is at least 50° C. higher than the average reactor temperature. The coked catalyst can be heated to a temperature of at least 500° C. In one embodiment, the coked catalyst is heated to form a coke composition having a hydrogen to carbon ratio of less than 0.95:1.

In another aspect of any of the above embodiments, the molecular sieve crystals comprise aluminosilicate crystals. In another, the molecular sieve crystals have a framework that furthers include [$PO_4$] tetrahedral units. In yet another, the molecular sieve crystals are of a chabazite structure. In still another, the molecular sieve crystals comprise silicoaluminophosphate crystals. Preferably, the silicoaluminophosphate is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, and metal containing molecular sieves thereof, more preferably SAPO-34. In another preferred embodiment, the catalyst further includes aluminophosphate as separate crystals or as an intergrowth composition.

BRIEF DESCRIPTION OF THE DRAWING

Examples of various embodiments of this invention are shown in the attached Figures, wherein.

DETAILED DESCRIPTION OF THE INVENTION

Figure 1:
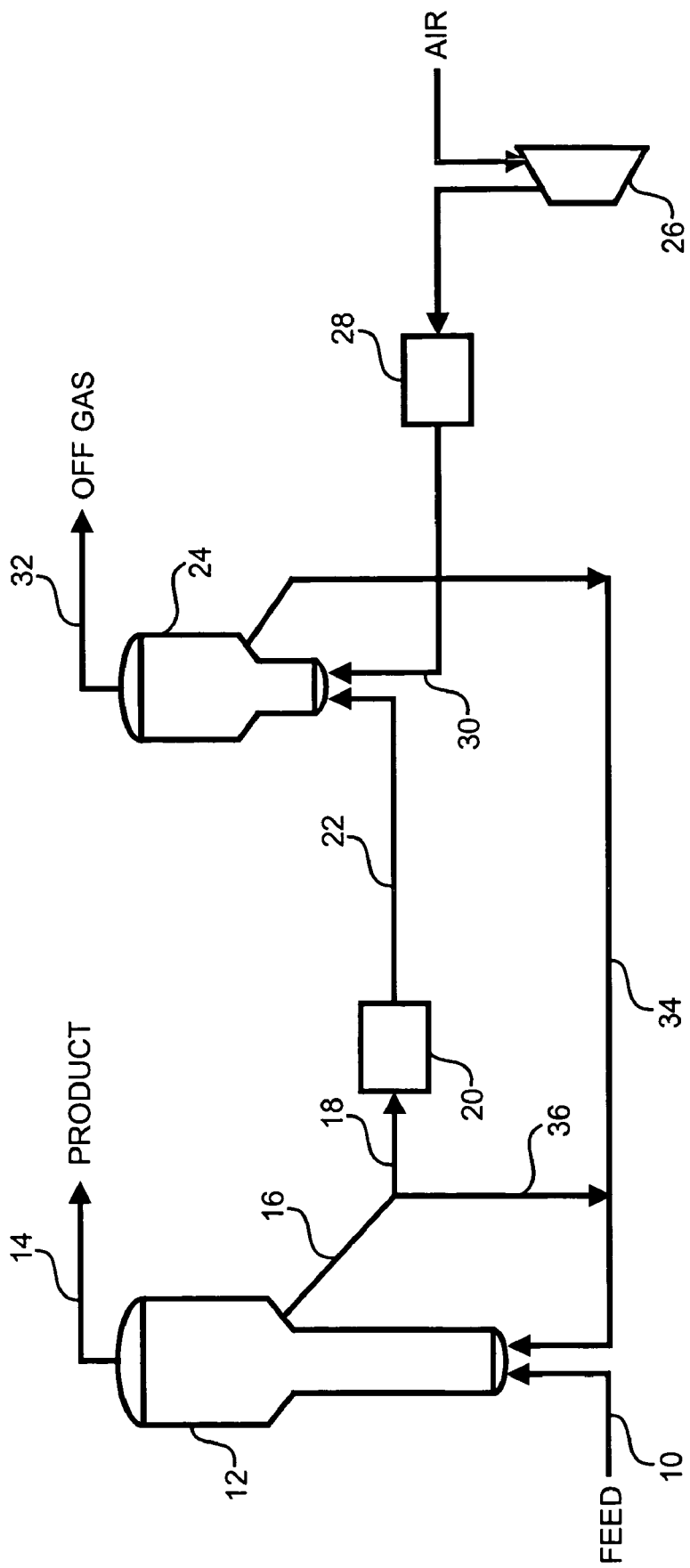
FIG. 1 is a flow diagram of one embodiment of the reaction system of the invention.

I. Controlling Loss of Catalytic Activity Through Regenerator Operation

This invention is directed to methods for protecting molecular sieve catalyst from loss of catalytic activity due to contact with moisture. The methods involve operating a regenerator vessel of the reaction system so as to limit any substantial decrease in catalytic activity.

The invention is unique in that the methods of the invention involve controlling the operation of the regenerator to protect catalytic activity, rather than the controlling the reactor or providing direct protection to the catalyst itself. Until this invention, controlling the regenerator conditions would not have been previously considered, since it had been previously thought that at relatively high temperature ranges deactivation of molecular sieves due to moisture conditions was not a problem. The inventors, however, have found that operating at high temperatures alone are not necessarily effective, and have provided methods for reducing or eliminating moisture deactivation problems through control of the regenerator. The methods of this invention provide protection to the catalyst by reducing regenerator water content, i.e., water partial pressure, as well as by controlling regenerator temperature.

II. Types of Catalyst

This invention incorporates the use of catalyst containing one more types of molecular sieve compositions, particularly those types of molecular sieves that contain active catalytic sites that are susceptible to deactivation due to contact with water molecules. In general, molecular sieves have various chemical, physical, and framework characteristics, and have been well classified by the Structure Commission of the International Zeolite Association according to the rules of the IUPAC Commission on Zeolite Nomenclature. A framework-type describes the topology and connectivity of the tetrahedrally coordinated atoms constituting the framework, and makes an abstraction of the specific properties for those materials. Framework-type zeolite and zeolite-type molecular sieves for which a structure has been established, are assigned a three letter code and are described in the *Atlas of Zeolite Framework Types*, 5th edition, Elsevier, London, England (2001).

Crystalline molecular sieve materials all have a 3-dimensional, four-connected framework structure of corner-sharing $TO_4$ tetrahedra, where T is any tetrahedrally coordinated cation. Molecular sieves are typically described in terms of the size of the ring that defines a pore, where the size is based on the number of T atoms in the ring. Other framework-type characteristics include the arrangement of rings that form a cage, and when present, the dimension of channels, and the spaces between the cages. See van Bekkum, et al., *Introduction to Zeolite Science and Practice, Second Completely Revised and Expanded Edition*, Volume 137, pages 1-67, Elsevier Science, B.V., Amsterdam, Netherlands (2001).

Non-limiting examples of molecular sieves are the small pore molecular sieves, AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof; the medium pore molecular sieves, AFO, AEL, EUO, HEU, FER, MEL, MFI, MTW, MTT, TON, and substituted forms thereof; and the large pore molecular sieves, EMT, FAU, and substituted forms thereof. Other molecular sieves include ANA, BEA, CFI, CLO, DON, GIS, LTL, MER, MOR, MWW and SOD. Non-limiting examples of preferred molecular sieves, particularly for converting an oxygenate containing feedstock into olefin(s), include AEI, AFI BEA, CHA, EDI, FAU, FER, GIS, LTA, LTL, MER, MFI, MOR, MTT, MWW and TON. In one preferred embodiment, the molecular sieve of the invention has an AEI topology or a CHA topology, or a combination thereof, most preferably a CHA topology.

The small, medium and large pore molecular sieves have from a 4-ring to a 12-ring or greater framework-type. Typically, the molecular sieves employed herein have 8-, 10- or 12-ring structures and an average pore size in the range of from about 3 Å to 15 Å. More typically, the molecular sieves used in this invention have 8-rings and an average pore size less than about 5 Å, such as in the range of from 3 Å to about 5 Å, for example from 3 Å to about 4.5 Å, and particularly from 3.5 Å to about 4.2 Å.

In one embodiment, molecular sieve crystals that are incorporated into the catalyst have a chabazite (CHA) structure, and the crystals are preferably made of a composition having a molar relationship within the structure of:

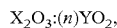

$$X_2O_3:(n)YO_2,$$

wherein X is a trivalent element, such as aluminum, boron, iron, indium, and/or gallium, preferably aluminum; Y is a tetravalent element, such as silicon, tin, titanium and/or germanium, preferably silicon; and n is greater than 10, preferably greater than 50, still more preferably greater than 100, preferably that ranges from about 10 to about 2000, more preferably from about 50 to about 600, most preferably from about 100 to about 300.

The molecular sieve that can be incorporated into the catalyst of this invention is prepared from a reaction mixture containing sources of water, an oxide of a trivalent element X, an oxide of a tetravalent element Y, and an organic templating agent or template. In general, templating agents or templates include compounds that contain elements of Group 15 of the Periodic Table of Elements, particularly nitrogen, phosphorus, arsenic and antimony. Typical templates also contain at least one alkyl or aryl group, such as an alkyl or aryl group having from 1 to 10 carbon atoms, for example from 1 to 8 carbon atoms. Preferred templates are nitrogen-containing compounds, such as amines, quaternary ammonium compounds and combinations thereof. Suitable quaternary ammonium compounds are represented by the general formula $R_4N^+$, where each R is hydrogen or a hydrocarbyl or substituted hydrocarbyl group, preferably an alkyl group or an aryl group having from 1 to 10 carbon atoms.

Non-limiting examples of templates include tetraalkyl ammonium compounds including salts thereof, such as tetramethyl ammonium compounds, tetraethyl ammonium compounds, tetrapropyl ammonium compounds, and tetrabutylammonium compounds, cyclohexylamine, morpholine, di-n-propylamine (DPA), tripropylamine, triethylamine (TEA), triethanolamine, piperidine, cyclohexylamine, 2-methylpyridine, N,N-dimethylbenzylamine, N,N-diethylethanolamine, dicyclohexylamine, N,N-dimethylethanolamine, choline, N,N'-dimethylpiperazine, 1,4-diazabicyclo(2,2,2)octane, N',N',N,N-tetramethyl-(1,6)hexanediamine, N-methyldiethanolamine, N-methyl-ethanolamine, N-methyl piperidine, 3-methyl-piperidine, N-methylcyclohexylamine, 3-methylpyridine, 4-methyl-pyridine, quinuclidine, N,N'-dimethyl-1,4-diazabicyclo(2,2,2)octane ion; di-n-butylamine, neopentylamine, di-n-pentylamine, isopropylamine, t-butyl-amine, ethylenediamine, pyrrolidine, and 2-imidazolidone. Preferred templates are selected from the group consisting of tetraethyl ammonium salts, cyclopentylamine, aminomethyl cyclohexane, piperidine, triethylamine, cyclohexylamine, tri-ethyl hydroxyethylamine, morpholine, dipropylamine (DPA), pyridine, isopropylamine, heated degraded forms thereof, and combinations thereof. In one embodiment, the template is preferably selected from the group consisting of N-alkyl-3-quinuclidinol, N,N,N-trialkyl-1-adamantammonium cations, N,N,N-trialkyl-exoami-nonorbornane and mixtures thereof, and is preferably a N,N,N-tri-methyl-1-adamantammonium cation.

In general, molecular sieve crystals that are incorporated into the catalyst have a molecular framework that includes $[AlO_4]$ and $[SiO_4]$ tetrahedral units. Such molecular sieves include aluminosilicates, particularly those having a chabazite structure.

In another embodiment, molecular sieve crystals that are incorporated into the catalyst have a molecular framework that includes $[AlO_4]$, $[PO_4]$ and $[SiO_4]$ tetrahedral units, such as silicoaluminophosphates (SAPO), and metal-substituted SAPO molecular sieves. Suitable metal substituents are alkali metals of Group IA of the Periodic Table of Elements, an alkaline earth metals of Group IIA of the Periodic Table of Elements, a rare earth metals of Group IIIB, including the Lanthanides: lanthanum, cerium, praseodymium, neodymium, samarium, europium, gadolinium, terbium, dysprosium, holmium, erbium, thulium, ytterbium and lutetium; and scandium or yttrium of the Periodic Table of Elements, transition metals of Groups IVB, VB, VIB, VIIB, VIIIB, and IB of the Periodic Table of Elements and mixtures of any of these metal species. In one embodiment, the metal is selected from the group consisting of Co, Cr, Cu, Fe, Ga, Ge, Mg, Mn, Ni, Sn, Ti, Zn and Zr, and mixtures thereof. The metal atoms may be inserted into the framework of a molecular sieve through a tetrahedral unit, such as $[MeO_2]$, and carry a net charge depending on the valence state of the metal substituent. For example, in one embodiment, when the metal substituent has a valence state of +2, +3, +4, +5, or +6, the net charge of the tetrahedral unit is between −2 and +2.

In one embodiment, the catalyst includes silicoaluminophosphate or metal-containing silicoaluminophosphate molecular sieve crystals. Preferably, the SAPO has a Si/Al ratio less than 0.65, such as less than 0.40, for example less than 0.32, and particularly less than 0.20. In one embodiment the molecular sieve has a Si/Al ratio in the range of from about 0.65 to about 0.08, such as from about 0.40 to about 0.10, and particularly from about 0.32 to about 0.10.

Non-limiting examples of SAPO molecular sieves useful herein include SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56 and metal containing molecular sieves thereof. Of these, particularly useful molecular sieves are SAPO-18, SAPO-34, SAPO-35, SAPO-44, SAPO-56 and metal containing derivatives thereof. SAPO-34 is particularly preferred.

In another embodiment of the invention, the catalyst used in this invention incorporates aluminophosphate (AlPO) molecular sieves. These molecular sieves can be included as separate crystals or they can be intermixed with other crystalline structures such as by an intergrowth structure. Examples of aluminophosphates include AlPO-5, AlPO-11, AlPO-18, AlPO-31, AlPO-34, AlPO-36, AlPO-37 and AlPO-46.

In one embodiment, the catalyst includes a combination of at least one SAPO and at least one AlPO molecular sieve, wherein the SAPO is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47 and SAPO-56, and the AlPO is selected from the group consisting of AlPO-5, AlPO-11, AlPO-18, AlPO-31, AlPO-34, AlPO-36, AlPO-37 and AlPO-46. The sieves can be combined as separate crystals or as intergrown crystals. Preferably, the SAPO is SAPO-18 or SAPO-34, and preferably, the AlPO is AlPO-34 or AlPO-18.

Additional examples of intergrowth molecular sieves useful in this invention include those described in U.S. Patent Application Publication No. 2002-0165089 and International Publication No. WO 98/15496, published Apr. 16, 1998, the descriptions of those sieves incorporated herein by reference. Note that SAPO-18, AlPO-18 and RUW-18 have an AEI framework-type, and SAPO-34 has a CHA framework-type, and that preferred molecular sieves used herein may comprise at least one intergrowth phase of AEI and CHA framework-types, especially where the ratio of CHA framework-type to AEI framework-type, as determined by the DIFFaX method disclosed in U.S. Patent Application Publication No. 2002-0165089, is greater than 1:1.

III. Oxygenate Conversion to Olefin Product

The process of the invention is generally referred to as the gas-to-olefins (GTO) process or, alternatively, the methanol-to-olefins (MTO) process. In these processes, an oxygenated feedstock is converted in the presence of a molecular sieve catalyst composition into one or more olefin(s). In particular, the feedstock contains one or more oxygenates, more specifically, one or more organic compound(s) containing at least one oxygen atom. Preferably, the oxygenate in the feedstock includes one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts.

Non-limiting examples of specific types of oxygenates useful in the invention include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof. In a preferred embodiment, the feedstock contains at least one oxygenate selected from the group consisting of methanol, ethanol, dimethyl ether, and diethyl ether; more preferably the oxygenate feed contains methanol and/or dimethyl ether, and most preferably the oxygenate feed contains methanol.

The feedstock is converted primarily into one or more olefin(s). The olefin(s) produced from the feedstock typically have from 2 to 30 carbon atoms, preferably 2 to 8 carbon atoms, more preferably 2 to 6 carbon atoms, still more preferably 2 to 4 carbons atoms, and most preferably are ethylene and/or propylene.

According to the invention, the amount of olefin(s) produced, based on the total weight of hydrocarbon produced, is greater than 50 weight percent, typically greater than 60 weight percent, such as greater than 70 weight percent, and preferably greater than 75 weight percent. In one embodiment, the amount of ethylene and/or propylene produced based on the total weight of hydrocarbon product produced is greater than 65 weight percent, such as greater than 70 weight percent, for example greater than 75 weight percent, and preferably greater than 78 weight percent. Typically, the amount ethylene produced in weight percent based on the total weight of hydrocarbon product produced, is greater than 30 weight percent, such as greater than 35 weight percent, for example greater than 40 weight percent. In addition, the amount of propylene produced in weight percent based on the total weight of hydrocarbon product produced is greater than 20 weight percent, such as greater than 25 weight percent, for example greater than 30 weight percent, and preferably greater than 35 weight percent.

In addition to the oxygenate component, such as methanol, the feedstock may contains one or more diluent(s), which are generally non-reactive to the feedstock or molecular sieve catalyst composition and are typically used to reduce the concentration of the feedstock. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The diluent, for example water, may be used either in a liquid or a vapor form, or a combination thereof. The diluent may be either added directly to the feedstock entering a reactor or added directly to the reactor, or added with the molecular sieve catalyst composition.

The process can be conducted over a wide range of reactor temperatures. For example, average reactor temperatures are in the range of from about 200° C. to about 1000° C. Preferably, the average reactor temperatures are in the range of from about 250° C. to about 800° C.; more preferably from about 250° C. to about 750° C., or from about 300° C. to about 650° C., or from about 350° C. to about 600° C., and most preferably from about 350° C. to about 550° C.

Similarly, the process can be conducted over a wide range of pressures including autogenous pressure. Typically the partial pressure of the oxygenate exclusive of any diluent therein employed in the process is in the range of from about 0.1 kPaa to about 5 MPaa, such as from about 5 kPaa to about 1 MPaa, and preferably from about 20 kPaa to about 500 kPaa.

The weight hourly space velocity (WHSV), defined as the total weight of feedstock excluding any diluents per hour per weight of molecular sieve in the catalyst composition, typically ranges from about 1 $hr^{-1}$ to about 5000 $hr^{-1}$, such as from about 2 $hr^{-1}$ to about 3000 $hr^{-1}$, for example from about 5 $hr^{-1}$ to about 1500 $hr^{-1}$, and conveniently from about 10 $hr^{-1}$ to about 1000 $hr^{-1}$. In one embodiment, the WHSV is greater than 20 $hr^{-1}$ and, where feedstock contains methanol and/or dimethyl ether, is in the range of from about 20 $hr^{-1}$ to about 300 $hr^{-1}$.

Where the process is conducted in a fluidized bed, the superficial gas velocity (SGV) of the total feedstock, including diluent and reaction products within the reactor system, and particularly within a riser reactor(s), is at least 0.1 meter per second (m/sec), such as greater than 0.5 m/sec, such as greater than 1 m/sec, for example greater than 2 m/sec, conveniently greater than 3 m/sec, and typically greater than 4 m/sec.

In one embodiment, the process is conducted as a fixed bed process. In a preferred embodiment, the process is carried out as a fluidized bed process (including a turbulent bed process), such as a continuous fluidized bed process, and particularly a continuous high velocity fluidized bed process.

The process can take place in a variety of catalytic reactors such as hybrid reactors that have a dense bed or fixed bed reaction zones and/or fast fluidized bed reaction zones coupled together, circulating fluidized bed reactors, riser reactors, and the like. Suitable conventional reactor types are described in for example U.S. Pat. No. 4,076,796, U.S. Pat. No. 6,287,522 (dual riser), and *Fluidization Engineering*, D. Kunii and O. Levenspiel, Robert E. Krieger Publishing Company, New York, N.Y. 1977.

Preferred reactor types are riser reactors generally described in *Riser Reactor, Fluidization and Fluid-Particle Systems*, pages 48 to 59, F. A. Zenz and D. F. Othmo, Reinhold Publishing Corporation, New York, 1960, and U.S. Pat. No. 6,166,282 (fast-fluidized bed reactor).

In one practical embodiment, the process is conducted as a fluidized bed process or high velocity fluidized bed process utilizing a reactor system, a regeneration system and a recovery system. In such a process the reactor system conveniently includes a fluid bed reactor system having a first reaction zone within one or more riser reactor(s) and a second reaction zone within at least one disengaging vessel, typically comprising one or more cyclones. In one embodiment, the one or more riser reactor(s) and disengaging vessel are contained within a single reactor vessel. Fresh feedstock, preferably containing one or more oxygenates, optionally with one or more diluent(s), is fed to the one or more riser reactor(s) into which a molecular sieve catalyst composition or coked version thereof is introduced. In one embodiment, prior to being introduced to the riser reactor(s), the molecular sieve catalyst composition or coked version thereof is contacted with a liquid, preferably water or methanol, and/or a gas, for example, an inert gas such as nitrogen.

Feedstock is fed to the reactor as a liquid or a vapor, or as a mixed vapor and liquid composition. In one embodiment, methanol is included in the feedstock, and the amount of methanol in the feed to the reactor is in the range of from 20 weight percent to about 98 weight percent, such as from about 40 weight percent to about 97 weight percent, or from about 50 weight percent to about 95 weight percent, based on the total weight of the feedstock including any diluent contained therein.

The feedstock entering the reactor system is preferably converted, partially or fully, in one or more reactors into a gaseous effluent that enters a disengaging vessel along with a coked catalyst composition. In one embodiment, cyclone(s) are provided within the disengaging vessel to separate the coked catalyst composition from the gaseous effluent containing olefin product. Although cyclones are preferred, gravity effects within the disengaging vessel can also be used to separate the catalyst composition from the gaseous effluent. Other methods for separating the catalyst composition from the gaseous effluent include the use of plates, caps, elbows, and the like.

In one embodiment, the disengaging vessel includes a stripping zone, typically in a lower portion of the disengaging vessel. In the stripping zone the coked catalyst composition is contacted with a gas, preferably one or a combination of steam, methane, carbon dioxide, carbon monoxide, hydrogen, or an inert gas such as argon, preferably steam, to recover adsorbed hydrocarbons from the coked catalyst composition that is then introduced to the regeneration system.

After separation of the gaseous effluent from the coked catalyst, the gaseous effluent is sent to a recovery section of the system where the olefins are separated into components parts. For example, ethylene and propylene, and well as any other olefin product, can be separated and recovered as separate products. The coked catalyst, which contains a carbonaceous layer that was formed during the conversion process, is recovered from the disengaging vessel and can be re-used as is or sent to a regenerator. In the regenerator, the coke or carbonaceous layer is removed by contacting the catalyst, which is still hot from the reaction process, with a regeneration gas to remove some or all of the coke deposit.

IV. Regeneration of Coked Catalyst

Following separation of coked catalyst from gaseous effluent in the reactor system, the coked catalyst is sent to a regenerator. In the regenerator, the coked catalyst is contacted with a regeneration medium, preferably a gas containing oxygen, under conventional regeneration conditions of temperature, pressure and residence time.

Non-limiting examples of suitable regeneration media include compositions comprising one or more of $O_2$, $O_3$, $SO_3$, $N_2O$, NO, $NO_2$, $N_2O_5$ and $H_2O$. A particularly preferred regeneration medium is one that contains $O_2$, for example, air. Suitable regeneration conditions are those capable of burning coke from the coked catalyst composition, preferably to a level less than 0.5 weight percent, based on the total weight of the catalyst. The regeneration pressure may be in the range of from about 15 psia (103 kPaa) to about 500 psia (3448 kPaa), such as from about 20 psia (138 kPaa) to about 250 psia (1724 kPaa), including from about 25 psia (172 kPaa) to about 150 psia (1034 kPaa), and conveniently from about 30 psia (207 kPaa) to about 60 psia (414 kPaa).

The residence time of the catalyst composition in the regenerator may be in the range of from about one minute to several hours, such as from about one minute to 100 minutes, and the volume of oxygen in the regeneration gas may be in the range of from about 0.01 mole percent to about 5 mole percent based on the total volume of the gas.

The burning of coke in the regeneration step is an exothermic reaction. In one embodiment of the invention, the temperature within the regeneration system is controlled by various techniques in the art including feeding a cooled gas to the regenerator vessel, operated either in a batch, continuous, or semi-continuous mode, or a combination thereof. A preferred technique involves withdrawing the regenerated catalyst composition from the regeneration system and passing it through a catalyst cooler to form a cooled regenerated catalyst composition. The catalyst cooler, in an embodiment, is a heat exchanger that is located either internal or external to the regeneration system.

The regenerated catalyst composition withdrawn from the regeneration system, preferably from the catalyst cooler, is combined with a fresh molecular sieve catalyst composition and/or re-circulated molecular sieve catalyst composition and/or feedstock and/or fresh gas or liquids, and returned to the riser reactor(s). In one embodiment, the regenerated catalyst composition withdrawn from the regeneration system is returned to the riser reactor(s) directly, preferably after passing through a catalyst cooler. A carrier, such as an inert gas, feedstock vapor, steam or the like, may be used, semi-continuously or continuously, to facilitate the introduction of the regenerated catalyst composition to the reactor system, preferably to the one or more riser reactor(s).

By controlling the flow of the regenerated catalyst composition or cooled regenerated catalyst composition from the regeneration system to the reactor system, the optimum level of coke on the molecular sieve catalyst composition entering the reactor is maintained. There are many techniques for controlling the flow of a catalyst composition described in Michael Louge, *Experimental Techniques, Circulating Fluidized Beds*, Grace, Avidan and Knowlton, eds., Blackie, 1997 (336-337.

Coke levels on the catalyst composition are measured by withdrawing the catalyst composition from the conversion process and determining its carbon content. Typical levels of coke on the molecular sieve catalyst composition, after regeneration, are in the range of from 0.01 weight percent to about 15 weight percent, such as from about 0.1 weight percent to about 10 weight percent, for example from about 0.2 weight percent to about 5 weight percent, and conveniently from about 0.3 weight percent to about 2 weight percent based on the weight of the molecular sieve in the catalyst.

A. Control of Regenerator Temperature

In one embodiment, substantial loss of catalytic activity is controlled by controlling the regenerator temperature. In particular, regeneration temperature should be kept sufficiently high to adequately remove coke deposited on the surface of the catalyst during conversion of oxygenate to olefin product. However, the regenerator should be kept at a temperature that is low enough so that catalytic activity is not substantially decreased as the coke is removed.

The catalyst containing the coke, i.e., the coked catalyst, should be contacted with regeneration medium in the regenerator so as to remove at least a portion of the coke, thereby forming a regenerated catalyst. The regenerated catalyst is then re-used to contact oxygenate feed and convert the oxygenate to olefin product. Preferably, the coked catalyst is contacted with regeneration medium in the regenerator at an average regenerator temperature of not greater than about 690° C., more preferably not greater than about 660° C., still more preferably not greater than about 630° C.; and most preferably not greater than about 600° C. The temperature as used herein refers to the average temperature measured in the bed of catalyst contained in the regenerator.

In another embodiment, the regenerator is operated at a temperature that is higher than the temperature of the coked catalyst that is removed from the reactor. Preferably, the average regenerator temperature is at least 50° C. higher than the temperature of the coked catalyst that is removed from the reactor, more preferably at least 75° C. higher, and most preferably at least 100° C. higher.

B. Increasing Hydrothermal Stability Index

In another embodiment of the invention, substantial loss of catalytic activity is controlled by increasing the hydrothermal stability index (HTSI) within the regenerator. The HTSI is defined as $$HTSI = PP_{stm,o} \div PP_{stm}$$

wherein $PP_{stm,o}$ is defined as the partial pressure of steam at a base case, and $PP_{stm}$ is actual partial pressure in the regenerator. The reference partial pressure of steam for purposes of this invention is 4.58 psia (31.5 kPa). This value is based on projections of the steam partial pressure present in a regenerator operated at 40 psia using air compressed from ambient with a 90° F. (32° C.) dew point and burning coked catalyst containing 4.5% (on total catalyst composition; in this example, the catalyst composite contains about 45% molecular sieve thus 4.5% on catalyst is equal to about 10% coke on molecular sieve) coke having an atomic H:C ratio on the coked catalyst of 0.95:1. It is possible to use any other reference partial pressure if desired but the HTSI based on another reference must be converted to the one defined herein for comparison via the formula:

$$HTSI = [PP_{stm,refnew} \div PP_{stm}/P]/[PP_{stm,refnew}/4.58 \text{ psia}]$$

where $PP_{stm,refnew}$ is any desired reference steam partial pressure.

According to this invention, the coke composition is removed in the regenerator at a hydrothermal stability index of greater than 1. Preferably, the coke composition is removed in the regenerator at a hydrothermal stability index of at least 1.1, more preferably at least 1.2, and most preferably at least 1.3.

The hydrothermal stability index within the regenerator can be increased in any number of ways that result in the decrease of the partial pressure of water in the regenerator. In one embodiment, the regenerator has a water partial pressure of not greater than 4.16 psia (28.7 kPa). Preferably, the regenerator has a water partial pressure of not greater than 3.82 psia (26.3 kPa), and more preferably not greater than 3.52 psia (24.3 kPa).

In one embodiment, the regeneration medium that is introduced into the regenerator is treated to reduce water content of the regeneration medium so that partial pressure within the regenerator will be reduced. Preferably, the regeneration medium that is added to the regenerator is a regeneration gas having a water partial pressure of not greater than 4 psia (27 kPa), preferably not greater than 3.5 psia (24 kPa), and most preferably not greater than 3 psia (21 kPa).

In one embodiment, the regeneration medium that is introduced into the regenerator is treated to reduce water content of the regeneration medium so that partial pressure within the regenerator will be reduced. Preferably, the regeneration medium that is added to the regenerator is a regeneration gas having a water partial pressure of not greater than 4 psia (27 kPa), preferably not greater than 3.5 psia (24 kPa), and most preferably not greater than 3 psia (21 kPa).

Any variety of means can be used to reduce the water content of the regeneration medium and obtain a regeneration gas having the appropriate predetermined water partial pressure. In one embodiment, regeneration gas is compressed, and optionally cooled, to condense at least a portion of any water included in the gas. In general, the amount of water contained in the compressed gas condenses once the gas is below its dew point. The fraction of water contained in the gas at saturation and at a given temperature can be predicted by referring to steam tables. See, e.g., *Steam/Its Generation and Use*, Babcock and Wilcox, New York, 1972, p 2-3. The condensed water is removed, and the regeneration gas, which is now considered partially dry regeneration gas, is sent to the regenerator and contacted with the coked catalyst to remove at least a portion of the coke from the catalyst.

In another embodiment, at least a portion of the water in the regeneration gas is removed by drying the regeneration gas by contacting the gas with an adsorbent. Any variety of adsorbents can be used, preferred are molecular sieves. In one embodiment of the invention, the adsorbent is a molecular sieve.

Any number of molecular sieve materials can be used as a water adsorbent. Examples include zeolite as well as non-zeolite molecular sieves, and are of the large, medium or small pore type. Non-limiting examples of these molecular sieves are the small pore molecular sieves, AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof; the medium pore molecular sieves, AFO, AEL, EUO, HEU, FER, MEL, MFI, MTW, MTT, TON, and substituted forms thereof; and the large pore molecular sieves, EMT, FAU, and substituted forms thereof. Other molecular sieves include ANA, BEA, CFI, CLO, DON, GIS, LTL, MER, MOR, MWW and SOD. Yet other examples of water adsorbents include aluminas, silica, 3 A molecular sieves, 4 A molecular sieves, and alumino-silicates.

In one embodiment, an adsorbent system that is used as part of this invention has multiple adsorbent beds. Multiple beds allow for continuous separation without the need for shutting down the process to regenerate the adsorbent. For example, in a three bed system typically one bed is on-line, one bed is regenerated off-line, and a third bed is on stand-by.

In anther embodiment of the invention, one or more adsorption beds can be arranged in series or parallel. As a specific example of one type of arrangement, water is first selectively removed using a 3 A molecular sieve. This bed can then be followed by one or more beds containing one or more adsorbents. Various other types of adsorbents can also be used, such as a larger pore molecular sieve e.g. 13X and/or a high surface area active alumina such as Selexorb CD (Alcoa tradename). In another embodiment, one bed contains a 3.6 A molecular sieve. This bed can then be followed by one or more 13X or active alumina beds.

The adsorbent system can be operated at ambient temperature or at elevated temperature as required, and with either upward or downward flow. Regeneration of the adsorbent materials can be carried out by conventional methods including treatment with a stream of a dry inert gas such as nitrogen at elevated temperature.

In another embodiment of the invention, the hydrothermal stability index is increased by controlling the H:C ratio of spent catalyst sent to regenerator. Preferably, the catalyst sent to the regenerator contains coke that has an atomic H:C ratio of less than 0.95:1, preferably not greater than 0.8:1, more preferably not greater than 0.7:1, still more preferably not greater than 0.6:1, and most preferably not greater than 0.5:1.

In an alternative embodiment, coke on the coked catalyst from the reactor that is sent to the regenerator is reduced in H:C ratio prior to entering the regenerator. Preferably, the H:C ratio of the coked catalyst is reduced by at least 15% from the time it leaves the reactor and before it enters the regenerator. More preferably the H:C ratio is reduced by at least by 25% and most preferably at least by 45%.

One way of reducing the H:C ratio of the coke residing on the spent catalyst is by heating the spent catalyst prior to regenerating in a gas containing little or no oxidizing components. Ideally, the coked catalyst is heated to a temperature higher than the average reactor temperature prior to contacting regeneration gas. Preferably, the coked catalyst is heated at to least 50° C., more preferably at least 75° C., and most preferably at least 100° C. higher than the temperature at the outlet of the reactor. After the coked catalyst is heated, it is introduced into the regenerator and contacted with regeneration gas.

Any gases or other materials that are evolved during reduction of the H:C ratio are preferably removed such as by stripping. Stripping can be accomplished using an effectively non-oxidizing steam of gas or vapor. Suitable stripping gases include steam, nitrogen or any other stream containing negligible fractions of oxygen.

In one embodiment, the coked catalyst is heated to a temperature of at least 500° C. Preferably, the coked catalyst is heated to a temperature of at least 550° C., more preferably at least 600° C.

In one embodiment, the coked catalyst is heated in a low oxygen environment. Preferably, the low oxygen environment has an oxygen content of not greater than 0.5 mole percent, more preferably not greater than 0.2 mole percent, and most preferably not greater than 0.1 mole percent.

One embodiment of the invention is shown in the FIG. 1, which is a simple flow diagram of an oxygenate to olefins system. According the embodiment shown, oxygenate feed is sent through a line 10 to a reactor 12. The oxygenate flows from the bottom of the reactor toward the top. As the oxygenate flows toward the top of the reactor it contacts a molecular sieve catalyst and is converted to olefin product. During the conversion process, the catalyst becomes coked, and, in the upper portion of the reactor 12, a disengaging system (not shown) is used to separate the coked catalyst from the olefin product. In the embodiment shown, the product is removed from the disengaging system through a line 14, and coked catalyst is removed through a line 16.

A portion of the coked catalyst flowing through the line 14 is sent back to the reactor through a line 36 and then through a line 34. Another portion of the coked catalyst is sent through a line 18 to a heating unit 20, where the coked catalyst is heated to effectively reduce the H:C ratio of the coke composition on the surface of the molecular sieve. The heated catalyst is then sent to a regenerator 24, where the catalyst is contacted with a regeneration medium to essentially burn off the coke composition to a desired coke content.

In the embodiment shown in the FIG. 1, the regeneration gas is air. The air is initially compressed by a compressor or blower 26 and then sent to a water removal system 28. The water removal system can include a cooler and/or settler that condenses and removes water from the compressed air or an adsorbent system that uses a water adsorbent to remove water from the compressed air.

After passing through the water removal system 28, the dry air is sent to the regenerator 24 for contacting with the coked catalyst. Inside the regenerator 24, combustion takes place removing at least a portion of the coke from the coked catalyst. The combustion gas that is produced is removed from the regenerator through a line 32, and regenerated catalyst is sent through the line 34 to be returned to the reactor 12 for reuse.

V. Examples

Additional embodiments of the invention are described by way of the following examples.

Experimental

Catalysts: The catalyst used in Examples 1-3 below contained ca. 45 wt % of SAPO-34 molecular sieve, whose $Si/Al_2$ ratio in the sieve fraction was 0.12.

Quantification of Acid Density Using $^1H$ NMR: Acid density is considered one of the key parameters in determining catalyst activity and, to some extent, catalyst selectivity to form light olefins (i.e., ethylene and/or propylene). In Examples 1-3, methanol conversion on SAPO-34 was catalyzed by Bronsted acid sites of the catalyst.

Sample Preparation for Proton Density Measurement: Since trace amounts of water will generally distort $^1H$ NMR intensity due to a relatively fast $^1H$ chemical exchange involving Bronsted acid sites and a water molecule, catalyst samples were activated (i.e., water was removed from the catalyst) using a shallow bed CAVERN device like that described by, Xu, T.; Haw, J. F., *Top. Catal.* 1997, 4, 109-118. A thin layer of catalyst was spread out in the CAVERN device, and the temperature of the catalyst bed was raised to 450° C. under evacuation, typically holding the catalyst at 450° C. for 2 hrs under vacuum to sufficiently remove water adsorbed in/on the catalyst.

The activated catalyst was loaded into a 5-mm NMR rotor, and the rotor was sealed with a Kel-F endcap by manipulating the CAVERN device. All operations were performed while the catalyst was under vacuum, ensuring sample integrity for NMR study. After the desired NMR spectra were acquired, the weight of the rotor, the catalyst and the endcap were determined, followed by weight determination of the rotor and the endcap upon unpacking the sample. The difference in the two weights was the amount of the catalyst in the rotor. Since these operations were performed without the use of a glovebox, electrostatic interaction between catalyst particles was no longer a problem.

NMR Spectroscopy: $^1H$ NMR experiments were performed on a 400 MHz solid state NMR spectrometer operating at 399.8 MHz for $^1H$. Quantitative $^1H$ spectra were obtained by the use of rotor-synchronized spin-echo sequence ($\pi/2$-$t_{D1}$-$\pi$-$t_{D2}$-Echo) using 9 kHz spinning speed, 3.5-µs π/2 pulses, $t_{D1}$ of 111.1-µs and $t_{D2}$ of 113.1-µs. Spectra acquired using the solid echo sequence showed some background signal, presumably from the spinning module and the endcap of the rotor. A solid echo sequence with DEPTH removes most of the background signal from the spectra. The spin-lattice relaxation time (T1) for protons in SAPO-34 was estimated to be less than 2-s by saturation-recovery. A pulse delay of 10-s was therefore sufficient for quantifying proton density of SAPO-34. Acetone was used as secondary standard for $^1H$ shift (2.1 ppm). All the reported chemical shifts were referenced to TMS (0 ppm).

Quantification of Acidic and Non-acidic Protons: In the Examples, the acid density data shown is expressed as a ratio of peak intensity between a catalyst sample and a reference sample. In the examples, we used the peak intensity of the Bronsted acid site for the parent sample of the two pilot runs as our reference. Thus, the Examples show a relative change in acid density rather than an absolute change in acid density.

Microflow Reactors for MTO Test: Experiments were performed with the use of a microflow reactor. A temperature rise 5° C. or less was observed. The flowrate of methanol was typically kept constant at 80 µl/min and at 40-psia methanol partial pressure. The amount of catalyst used was ca. 24 mg of formulated catalyst.

The catalyst was mixed with 1 g of siliconcarbide. The mixture was loaded into the reactor, which was made of ¼" siliconsteel tubing. The reactor temperature was increased to the desired reaction temperature and the catalyst was held under He flow (46 ml/min) for ca. 30 to 40 min for the temperature to stabilize. The reactor effluent was sampled in a 15-loop sampling valve to obtain the gas phase selectivity data.

GC Analysis: The collected effluent samples were analyzed using on-line gas chromatography (Hewlett Packard 6890) equipped with a flame ionization detector. The chromatographic column used was a Q-column. The response factors were as listed in Table 1.

TABLE 1

| $C_1$ | $C_2=$ | $C_2°$ | $C_3=$ | $C_3°$ | $CH_3OH$ | $(CH_3)_2O$ | $C_5$'s | $C_6$'s | $C_7$'s |
|---|---|---|---|---|---|---|---|---|---|
| 1.103 | 1.000 | 1.070 | 1.003 | 1.052 | 3.035 | 2.639 | 0.999 | 1.006 | 1.000 |

The response factors for 1-butene, butadiene, n-butane, trans-2-butene and cis-2-butene were 0.993, 1.000, 1.012, 0.998 and 0.999, respectively.

Weighed Averages and Coke Selectivity: The weighted averages (selectivities) were calculated based on the following formula:

$$x_1*y_1+(x_2-x_1)*y_2+(x_3-x_2)*(y_2+y_3)/2+(x_4-x_3)*(y_3+y_4)/2+\ldots$$

where $x_i$ and $y_i$ are yield and g methanol fed/g sieve, respectively. CMCPS (g/g catalyst) reported is Cumulative Methanol Converted Per gram of Sieve. Note that both CMCPS and WHSV were reported based on the weight of the sieve in the catalyst. Methanol converted at less than ca. 10% conversions was not counted in the calculations.

The rate constant was calculated based on the formula:

$$k(Hz)=-\ln(1-X)/(C_oV/F_o)$$

where $X_2=X_1/(1-18/46Y_{DME}-18/32Y_{MEOH})$, DME is dimethyl ether, MEOH us methanol, $C_o=P_{MEOH}/(RT)$, $P_{MEOH}$ is methanol feed partial pressure, $V=W_{catalyst}$*Sieve %/1500, and $F_o$, molar flow rate of methanol (mol/s).

Average rate constant, <k>, is calculated following the formula:

$$<k>=\{k_1*CMCPS_1+k_2*(CMCPS_2-CMCPS_1)+k_3*(CMCPS_3-CMCPS_2)+\ldots\}/CMCPS$$

where $k_i$ is first order rate constant calculated based on conversion measured for each of the gas phase samples.

Figure 2:
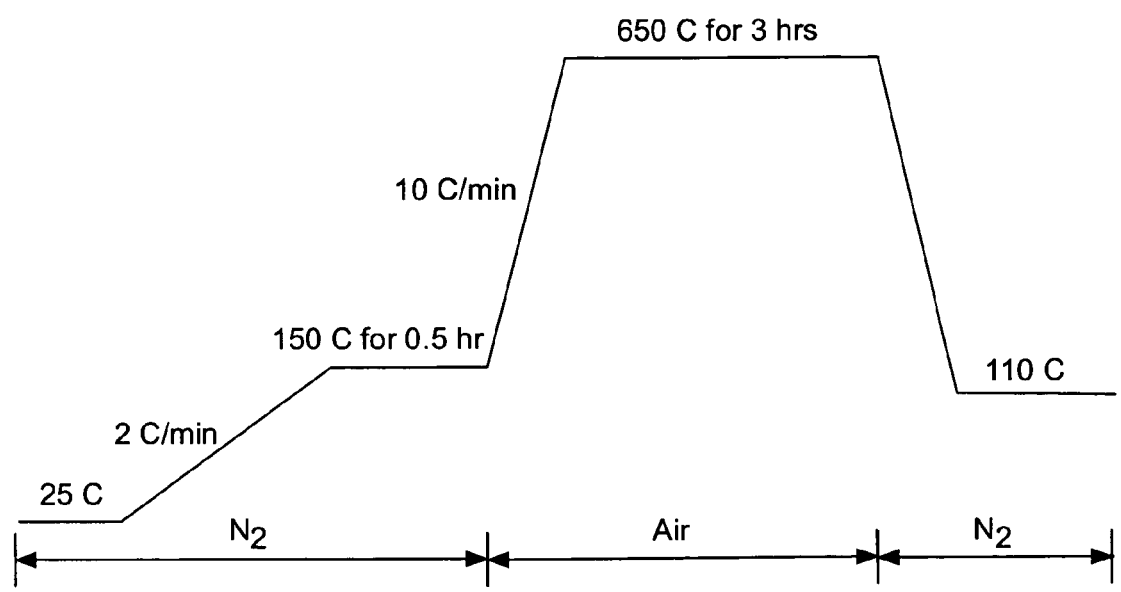
FIG. 2 is a gas injection sequence that was used in certain of the Examples to regenerate coked catalyst.

Lab Calcination Procedure: The standard lab calcination procedure is shown in FIG. 2. Since the properties of MTO catalysts usually change after calcination, the same calcination procedure was followed in all relevant Examples. Unless stated otherwise, the data shown was acquired after the catalyst had been calcined.

Example 1

To help understand the effect of regeneration temperature on catalyst stability, two extended reactor runs were performed in a process demonstration unit (PDU), consisting mainly of a riser reactor and a regenerator. The same catalyst was used in both PDU runs. The process conditions for the two runs were purposely kept to be identical or very similar except for the regeneration temperature. The regenerator temperature of the first run (average temperature of approximately 697° C.) was ca. 37° C. higher than that of the second run. During the runs, catalyst samples were taken periodically for microflow reactor studies.

Figure 3A:
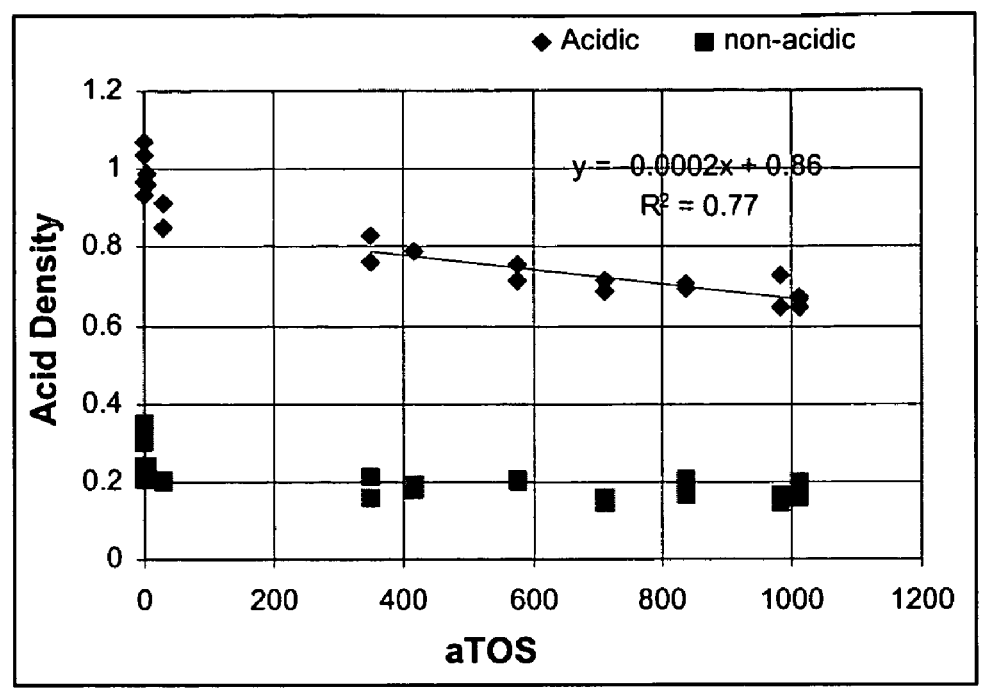
FIGS. 3A and 3B compare catalyst acid density and average time on stream (aTOS) for catalysts that were regenerated at different temperatures.
Figure 3B:
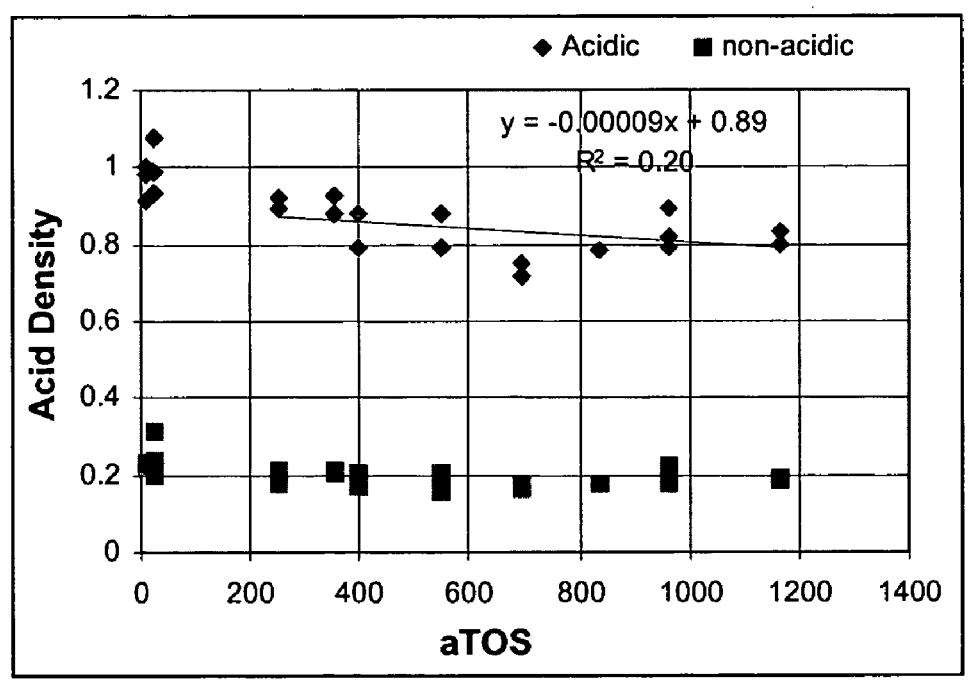

Acid density was determined as described above for the catalyst samples taken from the two runs. The results of the first and second runs are shown in FIG. 3A and FIG. 3B, respectively, as a function of actual time on stream (aTOS). The squares represent non-acidic protons. The non-acidic proton density, which accounts for roughly 20% of the Bronsted acid density of the catalyst, remains relatively constant over the entire aTOS for both runs.

The acid density (represented by diamonds) shows a decline as aTOS increases. The slope (rate of decline) for the first run (FIG. 3A) is $1.9\times10^{-4}$ aTOS$^{-1}$, 110% greater than that of the second run (FIG. 3B) ($9.0\times10^{-5}$ aTOS$^{-1}$).

The ratio of acid density shown in the FIG. 3A run is 0.65 at 1000 aTOS, and the value is 0.81 for the FIG. 3B run at 1200 aTOS. In other words, the acid density for the FIG. 3A run decreased ca. 35% (compared with the acid density for fresh catalyst) at 1000 aTOS while the decline for the FIG. 3B run is ca. 19% at ca. 1200 aTOS. The relative percentage difference between the acid density of the two runs (at the end of the runs) is more than 19%. The estimated relative standard deviation for proton acid density measurements is around 5-6%, significantly less than the relative percentage difference measured for the last samples of the two runs. It is unequivocal that there is significant difference between the acid density of the samples taken at the end of the two runs.

Acid density is a reflection of the number of active catalyst sites of the catalyst. A loss in acid density means that there is a loss in active catalyst sites, which ultimately means that the catalyst is less active. Thus, the run at the higher temperature has a more adverse effect on catalyst activity.

Example 2

Figure 4A:
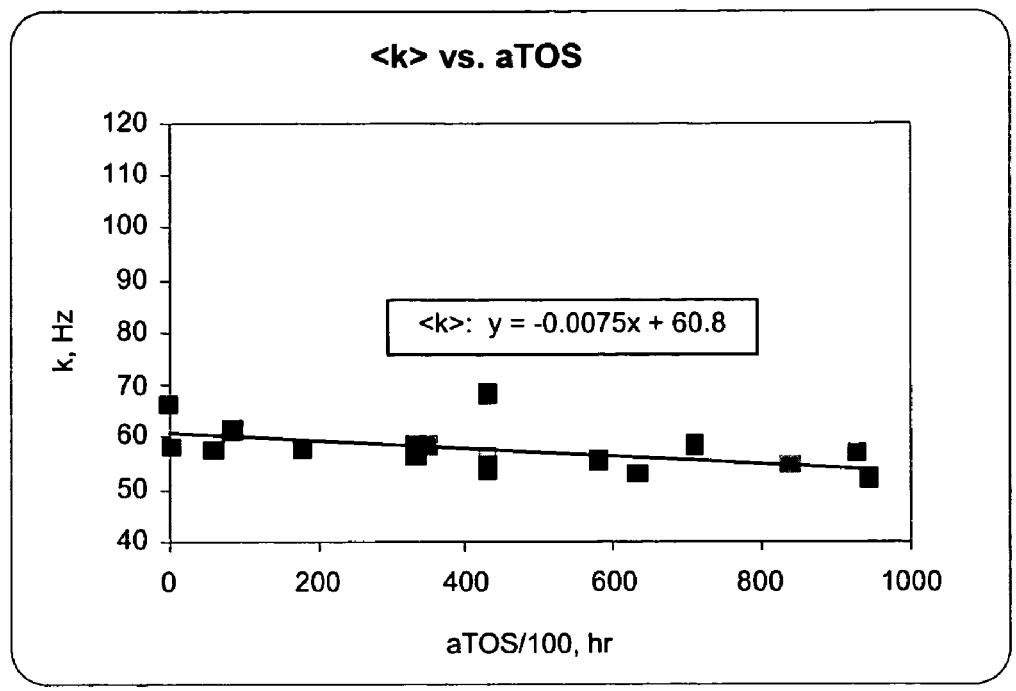
FIGS. 4A and 4B compare average first order rate constants (<k>) for catalysts that were regenerated at different temperatures.
Figure 4B:
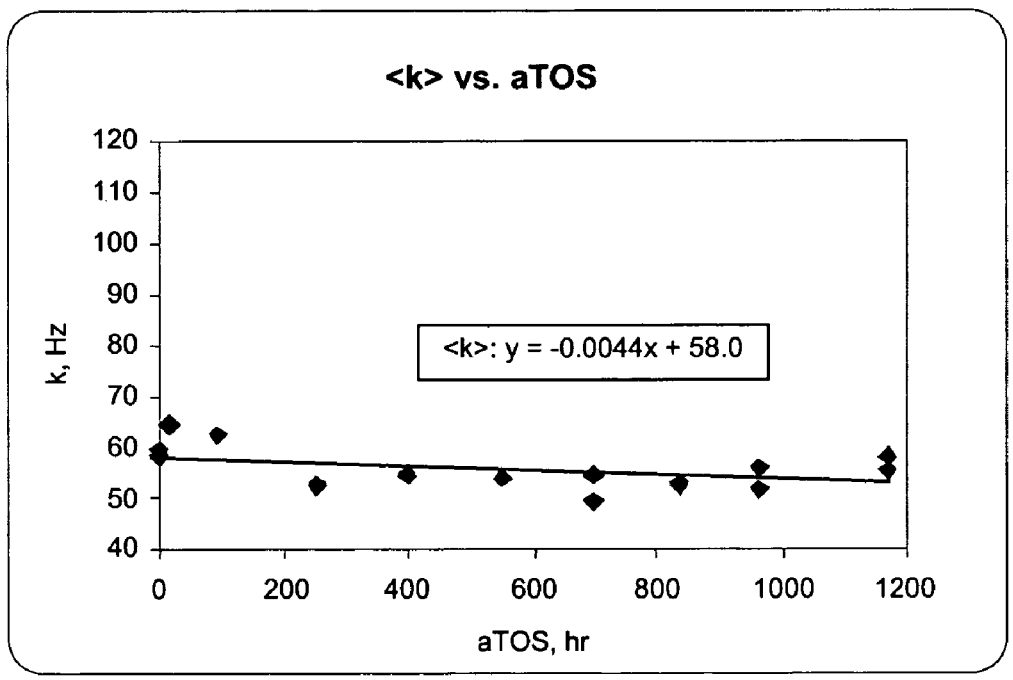

Average first order rate constant was determined for the two runs in Example 1. The results of the first and second runs are shown in FIG. 4A and FIG. 4B, respectively, as a function of average time on stream (aTOS). The average rate constant over the entire conversion curve, <k>, suggests a trend that is consistent with that of proton acid density. The slope from the linear fit of <k> as a function of aTOS suggests that <k> for the first run decreases almost twice as fast as that of the second run (0.0075 Hz/hr vs. 0.0044 Hz/hr).

Example 3

Figure 5A:
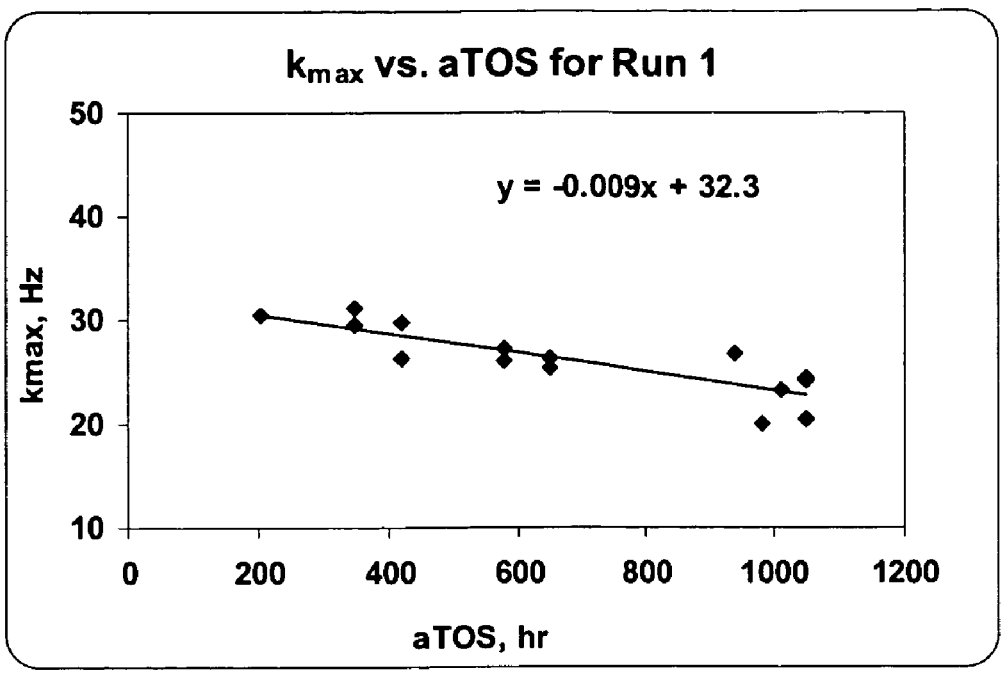
FIGS. 5A and 5B compare first order rate constants ($k_{max}$) for coked catalysts subjected to different regeneration conditions.
Figure 5B:
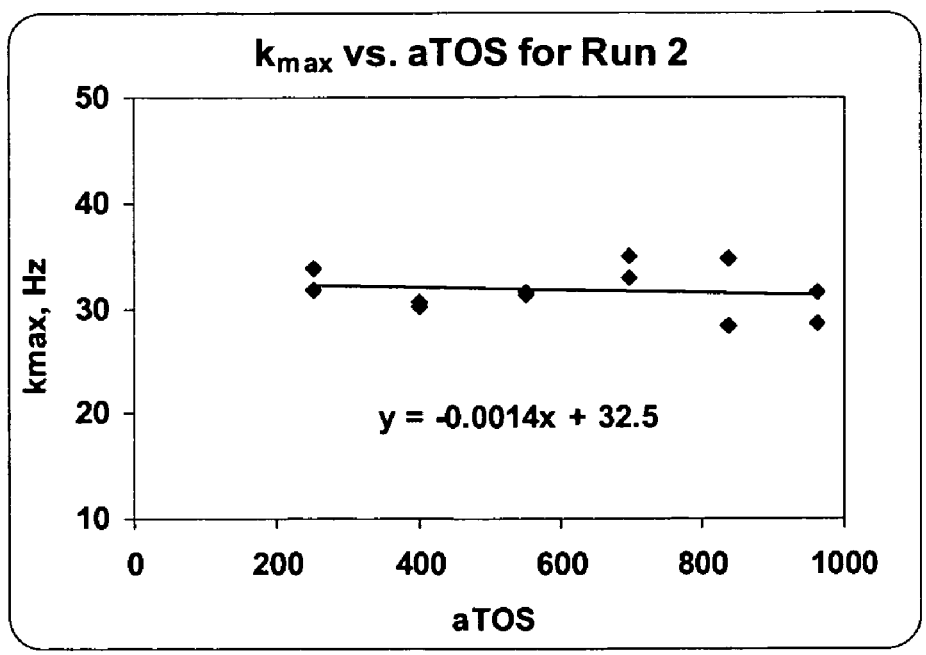

First order rate constant of coked catalyst, $k_{max}$, was determined for the two runs in Example 1. The results of the first and second runs are shown in FIG. 5A and FIG. 5B, respectively. Rate constants were measured at 450° C., 100 WHSV and 25 psig in a fixed bed microflow reactor, and are shown as triangles. The amount of coke on catalyst remains constant for the duration of each run.

The results from example 3 demonstrate that the deactivation rate in the first run is faster than that of the second run by comparing the difference in slope for the two sets of samples (0.009 Hz/hr for the first run vs. 0.0014 Hz/hr for the second run). The overall results from examples 1-3 show that the lower the average regeneration temperature, the less the reduction in catalyst activity and catalyst acid density.

Example 4

Figure 6:
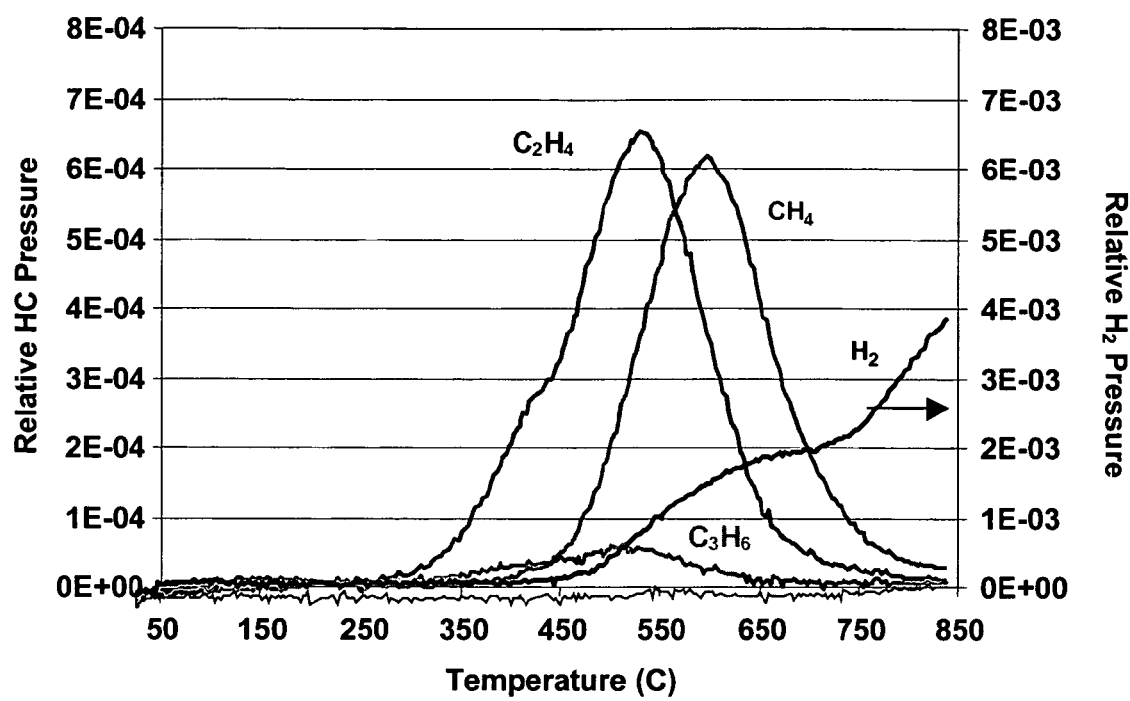
FIG. 6 shows removal of certain hydrocarbons from coked catalyst at different temperatures.

Coked SAPO-34 catalyst was analyzed for coke content. It was determined that the coked catalyst contained 4.5 wt % coke, based on the starting weight of the coked catalyst composite; since the molecular sieve content of the catalyst was 45%, the coke on the molecular sieve was about 10%. The coke was determined to be alkylated aromatic rings with an average composition of $C_xH_y$, wherein y/x=0.95. The coked catalyst was heated at a rate of 15° C. per minute in a flow of helium to remove hydrocarbons and hydrogen gas. The hydrocarbons removed were determined to have a hydrogen content greater than that of the coke on the catalyst prior to heating. Thus, the heat treatment had the effect of reducing the hydrogen content of the fraction of the coke that had not been removed from the catalyst. The amount of material removed versus temperature is shown in FIG. 6. Using the molecular formulas along with the total weight of each hydrocarbon and hydrogen removed, the calculated fraction of hydrogen removed by heating is shown in Table 2. Similarly, if the coked catalyst is exposed to a non-oxidizing gas at a constant temperature for a variable amount of time, the percent hydrogen removed from the coke via the release of relatively hydrogen rich molecules can be calculated. Several examples of this degree of de-hydrogenation are shown in Table 3.

TABLE 2

| Compound Removed | % of Total C on Catalyst | % of Total H on Catalyst |
|---|---|---|
| $H_2$ | — | 41.3 |
| $CH_4$ | 4.0 | 12.7 |
| $C_2H_4$ | 8.2 | 14.8 |
| $C_3H_6$ | 1.3 | 2.3 |
| Total of above | 13.5 | 71.1 |

TABLE 3

| Temperature (° C.) | % H Removed | Heating Time |
|---|---|---|
| 550 | 23.2 | ~10 min |
| 600 | 37.1 | ~5 min |
| 650 | 46.3 | ~3 min |

FIG. 6, Table 2 and Table 3 show that heating coked catalyst in a non-oxidizing gas can effectively decrease the H:C ratio of the residual coke. By decreasing H:C ratio, there will be less water formed when the heated catalyst is subsequently regenerated in the presence of substantial amounts of oxygen.

Example 5

The effect of reducing H:C ratio is further illustrated in Table 4 in which the base case hydrogen (contains 100% of initial H) of the spent catalyst is reduced, via heating, to the values shown (Examples 5.1-5.3). In the base case, the estimated partial pressure of steam in the regenerator is 4.58 psia. At reduced hydrogen content in the coked catalyst composite, the calculated steam partial pressures range from 4.01 to 3.42 psia for the hydrogen contents indicated. As shown in Table 4, these lowered hydrogen contents result in HTS Indices ranging from 1.14 to 1.34, reflecting a substantial increase in catalyst lifetime caused by reducing the partial pressure of steam.

TABLE 4

|  | Base Case | Ex. 5.1 | Ex. 5.2 | Ex. 5.3 |
|---|---|---|---|---|
| % of Initial Hydrogen | 100 | 77 | 63 | 54 |
| % of Initial Hydrogen removed | 0 | 23 | 37 | 46 |
| Misc steam (#/hr) | 2905 | 2905 | 2905 | 2905 |
| Carried with catalyst (#/hr) | 503 | 503 | 503 | 503 |
| Lift steam (#/hr) | 796 | 796 | 796 | 796 |
| Water from: |  |  |  |  |
| Air (#/hr) | 10121 | 10121 | 10121 | 10121 |
| H in coke (#/hr) | 21717 | 16679 | 13660 | 11662 |
| Wet air flow (#/hr) | 481955 |  |  |  |
| Dry air flow (moles/hr) | 15482 | 15482 | 15482 | 15482 |
| Total steam (#/hr) | 36042 | 31004 | 27985 | 25987 |
| moles/hr Steam | 2002 | 1722 | 1555 | 1444 |
| Total moles/hr | 17484 | 17191 | 17023 | 16912 |
| PP steam at 40 psia | 4.58 | 4.01 | 3.65 | 3.41 |
| HTS Index | 1.00 | 1.14 | 1.26 | 1.34 |

Example 6

Air is sent to an air "blower," cooled upon exiting the blower to condense at least some of the water in the air, and then the air is provided at elevated pressure to a regenerator. Several temperatures are illustrated in Table 5 (Base Case and Examples 6.1-6.5). In these examples the Base case conditions are held constant except that the air compressor outlet stream is cooled via, for example, a chilled water heat exchanger placed in the compressor exit stream to the temperatures listed. The un-chilled exit temperature is estimated to be 342° F. (172° C.). Note that in these examples, chilling to 100° F. (38° C.) does not result in an increase in the HTS Index since at the assumed ambient humidity and at the compression needed (40 psia outlet) the exit air is not yet saturated, and thus no water is removed. However, at the assumed conditions, further decreasing the exit temperature will result in water removal and thus lead to a lower water partial pressure in the regenerator. As illustrated in Table 5, the resulting HTS factors range from 1.03 to 1.21 (indicating corresponding improvements in catalyst lifetime).

TABLE 5

|  | BASE Case | Ex. 6.1 | Ex. 6.2 | Ex. 6.3 | Ex. 6.4 | Ex. 6.5 |
|---|---|---|---|---|---|---|
| Compressor outlet T, °F. (°C.) | 352 (178) | 100 (38) | 90 (32) | 80 (27) | 70 (21) | 60 (16) |
| Psat, psia | 127 | 0.9492 | 0.6981 | 0.5068 | 0.3629 | 0.2561 |
| Misc Steam | 2905 | 2905 | 2905 | 2905 | 2905 | 2905 |
| Carried with cat | 503 | 503 | 503 | 503 | 503 | 503 |
| Lift Steam | 796 | 796 | 796 | 796 | 796 | 796 |
| Water from: |  |  |  |  |  |  |
| Air | 10121 | 10121 | 8832 | 6412 | 4591 | 3240 |
| H in Coke | 21717 | 21717 | 21717 | 21717 | 21717 | 21717 |
| wet air flow lbs/hr | 481955 | 481955 | 481955 | 481955 | 481955 | 481955 |
| dry air flow, moles | 15482 | 15482 | 15482 | 15482 | 15482 | 15482 |
| Total Steam, lb/hr | 36042 | 36042 | 34753 | 32333 | 30512 | 29161 |
| moles/hr Steam | 2002 | 2002 | 1931 | 1796 | 1695 | 1620 |
| Total Moles/hr | 17484 | 17484 | 17413 | 17278 | 17177 | 17102 |
| PP steam at 40 psia | 4.58 | 4.58 | 4.44 | 4.16 | 3.95 | 3.79 |
| Δ PPstm | 0 | 0 | −0.15 | −0.42 | −0.63 | −0.79 |
| HTS Index | 1.00 | 1.00 | 1.03 | 1.10 | 1.16 | 1.21 |

Reducing the steam partial pressure by either removing at least a portion of the hydrogen in the coke on the catalyst or by removing at least a part of the water contained in the inlet compressed gas stream has the same effect on the HTS Index. Because of this, the combined effect of carrying out both operations can be captured by the formula:

$$HTS\ Index = HTSI,[H:C] * HTSI,[air]$$

where HTSI,[H:C] and HTSI,[air] refer to the HTS Indices that result from removing part of the coke hydrogen and part of the water contained in the compressed air, respectively. For example, in the above Examples 5.3 and 6.5, the combined effect of removing 46% of the H in the coke (Example 5.3) and cooling the air stream to 60° F. (16° C.) (Example 6.5) will provide a combined HTSI of:

$$HTSI = 1.34 * 1.21 = 1.62$$

Having now fully described this invention, it will be appreciated by those skilled in the art that the invention can be performed within a wide range of parameters within what is claimed, without departing from the spirit and scope of the invention.

We claim:

1. A process for reducing deactivation of catalyst used in converting oxygenate to an olefin composition, comprising the steps of:
    a) providing a catalyst that comprises silicoaluminophosphate crystals;
    b) contacting the oxygenate with the catalyst in a reactor to form the olefin composition and a coked catalyst;
    c) sending at least a portion of the coked catalyst in the reactor to a regenerator; and
    d) contacting the coked catalyst with regeneration gas comprising substantially oxygen in the regenerator so as to remove at least a portion of the coke composition on the coked catalyst at an average regenerator temperature of not greater than 690° C.; wherein the coked catalyst is heated prior to contacting with regeneration gas to reduce a water partial pressure in the regenerator.

2. The process of claim 1, wherein the coke composition is removed at an average regenerator temperature of not greater than 660° C.

3. The process of claim 2, wherein the coke composition is removed at an average regenerator temperature of not greater than 63° C.

4. The process of claim 3, wherein the coke composition is removed at an average regenerator temperature of not greater than 600° C.

5. The process of claim 1, wherein the coke composition is removed in the regenerator at a hydrothermal stability index of at least 1.1.

6. The process of claim 5, wherein the coke composition is removed in the regenerator at a hydrothermal stability index of at least 1.2.

7. The process of claim 6, wherein the coke composition is removed in the regenerator at a hydrothermal stability index of at least 1.3.

8. The process of claim 1, wherein the regenerator has a water partial pressure of not greater than 4.16 psia (28.7 kPa).

9. The process of claim 1, wherein the regeneration gas is added to the regenerator at a water partial pressure of not greater than 4 psia (27 kPa).

10. The process of claim 1, wherein the regeneration gas is compressed to condense at least a portion of water contained in the gas to contacting the coked catalyst.

11. The process of claim 1, wherein the regeneration gas is compressed, and the compressed regeneration gas is contacted with a water adsorbent, prior to contacting with the coked catalyst.

12. The process of claim 1, wherein the coked catalyst is heated in an environment that has not greater than 1.0 mole percent oxygen.

13. The process of claim 1, wherein the coked catalyst is heated to a temperature that is higher than an average reactor temperature.

14. The process of claim 1, wherein the coked catalyst is heated to a temperature that is at least 50° C. higher than the average reactor temperature.

15. The process of claim 1, wherein the coked catalyst is heated to at least 500° C.

16. The process of claim 1, wherein the coked catalyst is heated to form a coke composition having a hydrogen to carbon ratio of less than 0.95:1.

17. The process of claim 1, wherein the silicoaluminophosphate is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, and metal containing molecular sieves thereof.

18. The process of claim 17, wherein the silicoaluminophosphate is SAPO-34.

19. A process for reducing deactivation of catalyst used in converting oxygenate to an olefin composition, comprising the steps of:
 a) providing a catalyst that comprises silicoaluminophosphate crystals;
 b) contacting the oxygenate with the catalyst in a reactor to form the olefin composition and a coked catalyst;
 c) heating at least a portion of the coked catalyst in an environment that has not greater than 1.0 mole percent oxygen to reduce a water partial pressure in a regenerator; and
 d) contacting the heated catalyst with regeneration gas comprising substantially oxygen in a regenerator so as to remove at least a portion of the coke composition on the catalyst.

20. The process of claim 19, wherein the regenerator has an average temperature of not greater than 690° C.

21. The process of claim 20, wherein the coke composition is removed at an average regenerator temperature of not greater than 660° C.

22. The process of claim 21, wherein the coke composition is removed at an average regenerator temperature of not greater than 630° C.

23. The process of claim 22, wherein the coke composition is removed at an average regenerator temperature of not greater than 600° C.

24. The process of claim 19, wherein the coke composition is removed in the regenerator at a hydrothermal stability index of at least 1.1.

25. The process of claim 24, wherein the coke composition is removed in the regenerator at a hydrothermal stability index of at least 1.2.

26. The process of claim 25, wherein the coke composition is removed in the regenerator at a hydrothermal stability index of at least 1.3.

27. The process of claim 19, wherein the regenerator has a water partial pressure of not greater than 4.16 psia (28.7 kPa).

28. The process of claim 19, wherein the regeneration gas is added to the regenerator at a water partial pressure of not greater than 4 psia (27 kPa).

29. The process of claim 19, wherein the regeneration gas is compressed to condense at least a portion of water contained in the gas to contacting the coked catalyst.

30. The process of claim 19, wherein the regeneration gas is compressed, and the compressed regeneration gas is contacted with a water adsorbent, prior to contacting with the coked catalyst.

31. The process of claim 27, wherein the coked catalyst is heated to a temperature that is higher than an average reactor temperature.

32. The process of claim 27, wherein the coked catalyst is heated to a temperature that is at least 500° C. higher than the average reactor temperature.

33. The process of claim 27, wherein the coked catalyst is heated to at least 500° C.

34. The process of claim 27, wherein the coked catalyst is heated to form a coke composition having a hydrogen to carbon ratio of less than 0.95:1.

35. The process of claim 19, wherein the silicoaluminophosphate is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, and metal containing molecular sieves thereof.

36. The process of claim 19, wherein the silicoaluminophosphate is SAPO-34.

37. A process for reducing deactivation of catalyst used in converting oxygenate to an olefin composition, comprising the steps of:
 a) providing a catalyst that comprises silicoaluminophosphate crystals;
 b) contacting the oxygenate with the catalyst in a reactor to form the olefin composition and a coked catalyst; and
 c) contacting at least a portion of the coked catalyst with regeneration gas comprising substantially oxygen in a regenerator so as to remove at least a portion of the coke composition on the coked catalyst, wherein the regenerator has a water partial pressure of not greater than 4.16 psia (28.7 kPa); wherein the coked catalyst is heated prior to contacting with regeneration gas to reduce a water partial pressure in the regenerator.

38. The process of claim 37, wherein the regeneration gas is compressed to condense at least a portion of water contained in the gas to contacting the coked catalyst.

39. The process of claim 37, wherein the regeneration gas is added to the regenerator at a water partial pressure of not greater than 4 psia (27 kPa).

40. The process of claim 37, wherein the regeneration gas is compressed, and the compressed regeneration gas is contacted with a water adsorbent, prior to contacting with the coked catalyst.

41. The process of claim 37, wherein the coke composition is removed at an average regenerator temperature of not greater than 660° C.

42. The process of claim 41, wherein the coke composition is removed at an average regenerator temperature of not greater than 630° C.

43. The process of claim 42, wherein the coke composition is removed at an average regenerator temperature of not greater than 600° C.

44. The process of claim 37, wherein the coke composition is removed in the regenerator at a hydrothermal stability index of at least 1.1.

45. The process of claim 44, wherein the coke composition is removed in the regenerator at a hydrothermal stability index of at least 1.2.

46. The process of claim 45, wherein the coke composition is removed in the regenerator at a hydrothermal stability index of at least 1.3.

47. The process of claim 37, wherein the regenerator has a water partial pressure of not greater than 3.82 psia (26.3 kPa).

48. The process of claim 37, wherein the silicoaluminophosphate is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO 41, SAPO-42, SAPO-44, SAPO-47, SAPO-56, and metal containing molecular sieves thereof.

49. The process of claim 37, wherein the silicoaluminophosphate is SAPO-34.

\* \* \* \* \*

UNITED STATES PATENT AND TRADEMARK OFFICE
CERTIFICATE OF CORRECTION

PATENT NO. : 7,619,128 B2  Page 1 of 1
APPLICATION NO. : 11/089965
DATED : November 17, 2009
INVENTOR(S) : Xu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1188 days.

Signed and Sealed this

Twenty-sixth Day of October, 2010

David J. Kappos
*Director of the United States Patent and Trademark Office*